United States Patent
Hawkins et al.

(10) Patent No.: US 7,814,234 B2
(45) Date of Patent: Oct. 12, 2010

(54) OFFLINE EXECUTION OF WEB BASED APPLICATIONS

(75) Inventors: Jonathan C. Hawkins, Seattle, WA (US); Shanku S. Niyogi, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 546 days.

(21) Appl. No.: 11/554,435

(22) Filed: Oct. 30, 2006

(65) Prior Publication Data

US 2008/0104195 A1 May 1, 2008

(51) Int. Cl.
G06F 15/16 (2006.01)

(52) U.S. Cl. ............... 709/250; 709/231; 709/217; 709/201; 709/227; 715/746

(58) Field of Classification Search ............ 707/202; 709/250
See application file for complete search history.

(56) References Cited

U.S. PATENT DOCUMENTS

| | | | |
|---|---|---|---|
| 5,951,636 A | 9/1999 | Zerber | |
| 6,044,398 A * | 3/2000 | Marullo et al. | 709/219 |
| 6,272,593 B1 * | 8/2001 | Dujari | 711/118 |
| 6,594,682 B2 | 7/2003 | Peterson et al. | |
| 6,779,042 B1 | 8/2004 | Kloba et al. | |
| 6,854,016 B1 | 2/2005 | Kraenzel et al. | |
| 6,941,310 B2 * | 9/2005 | Ahad et al. | 707/100 |
| 7,275,105 B2 * | 9/2007 | Bloch et al. | 709/227 |
| 7,475,089 B1 * | 1/2009 | Geddes | 1/1 |
| 7,496,687 B2 * | 2/2009 | Griffin et al. | 709/249 |
| 2002/0059425 A1 * | 5/2002 | Belfiore et al. | 709/226 |
| 2002/0077927 A1 * | 6/2002 | Lasnier et al. | 705/26 |
| 2002/0083132 A1 * | 6/2002 | Holland et al. | 709/203 |
| 2003/0055927 A1 | 3/2003 | Fischer et al. | |
| 2003/0056206 A1 | 3/2003 | Engo | |
| 2003/0158947 A1 | 8/2003 | Block et al. | |
| 2003/0182414 A1 * | 9/2003 | O'Neill | 709/223 |
| 2004/0064570 A1 | 4/2004 | Tock | |
| 2004/0133538 A1 | 7/2004 | Amiri et al. | |
| 2004/0157641 A1 | 8/2004 | Chithambaram et al. | |
| 2004/0236777 A1 | 11/2004 | Pardikar et al. | |
| 2005/0070259 A1 | 3/2005 | Kloba et al. | |
| 2005/0102370 A1 | 5/2005 | Lin et al. | |
| 2005/0102660 A1 * | 5/2005 | Chen et al. | 717/168 |
| 2005/0188051 A1 * | 8/2005 | Sneh | 709/213 |

(Continued)

OTHER PUBLICATIONS

BackWeb For Oracle's PeopleSoft ePerformance, BackWeb Offline Access Server for Oracle's, PeopleSoft ePerformance, 2005 BackWeb Technologies Ltd.

(Continued)

Primary Examiner—Ashok B Patel
Assistant Examiner—Andrew Goldberg
(74) Attorney, Agent, or Firm—Workman Nydegger (57) ABSTRACT

The present invention extends to methods, systems, and computer program products for offline execution of Web based applications. Embodiments of the present invention facilitate the local storage of Web based executable instructions and data at a computer system. The Web based executable instructions and data can be used to locally fulfill requests (directed to a domain that sent the executable instructions and data for storage) from modules associated with a Web browser at the computer system. Accordingly, locally stored Web based executable instructions and data can be used at a computer system to simulate communication with Web site when the Web site is otherwise unavailable.

14 Claims, 4 Drawing Sheets

U.S. PATENT DOCUMENTS

| | | |
|---|---|---|
| 2005/0197819 A1 | 9/2005 | Hopkins et al. |
| 2005/0235012 A1 | 10/2005 | Harry et al. |
| 2006/0004927 A1* | 1/2006 | Rehman et al. ............. 709/250 |
| 2006/0031784 A1* | 2/2006 | Makela ....................... 715/850 |
| 2006/0069704 A1* | 3/2006 | Breeden et al. ............. 707/202 |
| 2006/0195816 A1* | 8/2006 | Grandcolas et al. ......... 717/101 |
| 2007/0016676 A1* | 1/2007 | Breuer et al. ............... 709/225 |
| 2007/0033588 A1* | 2/2007 | Landsman .................. 717/178 |

OTHER PUBLICATIONS

The Curl Client/Web Platform, 2001-2002 Curl Corporation.

Viellard, Etienne, Oracle9i Lite, An Oracle Business White Paper, Sep. 2001.

Stettler, Christian, Online and Offline Operation of J2EE Enterprise Applications, Diploma Thesis in Computer Science, Nov. 5, 2003.

* cited by examiner

OFFLINE EXECUTION OF WEB BASED APPLICATIONS

CROSS-REFERENCE TO RELATED APPLICATIONS

Not Applicable.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing components.

One common form of network based communication is exchanging electronic messages on the Worldwide Web ("WWW"). Content on the Worldwide Web is typically accessed in a client/server model. A "Web browser" of a client computer system sends a request to access content that is provided by a "Web Server" of a server computer system (e.g., by entering a Uniform Resource Locator ("URL") into the Web browser). If the user of the Web browser is authorized to access the content, the Web server typically provides the content to the Web browser. In a Web environment, content and requests for content, are frequently transported using Hypertext Transfer Protocol ("HTTP"). Web-based content can be provided in HyperText Markup Language ("HTML") pages, style sheets, images, scripts, etc.

Most, if not all Web browsers, cache portions of Web-based content in a common storage location (the browser cache) so that subsequent renderings of a Web page can be presented more efficiently. For example, when a Web browser receives a Web page from a Web server, the Web browser can locally cache portions of the content included in the Web page. Thus, if the Web browser is subsequently directed to the same Web page, the Web browser can check the common storage location for cached portions of content and any cached portions of content can be combined with other content received via the network to construct the Web page. Accordingly, using locally cached content potentially reduces the amount of data that is transferred over a network in order to display content from the Web server. As a result, Web pages can be rendered more quickly improving the user experience.

However, typically, even if only a portion of a Web page changes the entire page is reloaded over the network for display on a Web browser. For example it may be that a Web browser accesses a Web page, downloads content of the Web page via network communication, and caches content from the Web page. If the content of the Web page subsequently changes, the Web browser can be required to re-download the entire Web page even if only small portions of the Web page have changed.

Thus more recently, some Web browsers have implemented partial page updates to better utilize cached content. Content is re-downloaded when an applicable portion of a Web page changes. However, a Web browser is not necessarily required to re-download all the content of Web page in response to a change to a portion of the Web page. For example, when a single image in a Web page changes, the Web browser can detect the change and re-download the single image without having to re-download other cached content that has not changed.

Some Web-based applications also permit Web browsers to interact with data from a database (e.g., an SQL database). A Web server receives a request from a Web browser, accesses an appropriate portion of database data, and returns the database data to the Web browser. Depending on the configuration of the Web based application, a user may also be able to change portions of database data through the Web browser. For example, a user may be able to create and modify database records through the Web browser. In some environments, a user is able to implement SQL operations (CREATE TABLE, SELECT, INSET, UPDATE, DELETE, etc.) through a Web browser. Thus, a Web browser essentially provides a user-interface for manipulating database data over a network (e.g., the Internet).

However, there is typically no mechanism for a Web browser to appropriately cache tabular data (e.g., data from a database). Typically, a user does not access all the data within a database at any one times. Thus, caching any received database data provides an incomplete (and potentially non-functioning) data set. Further, since content is typically cached in a common location (the browser cache), caching database data from one Web site (or domain) potentially makes the cached database data available to any other Web site (or domain) the Web browser accesses. For example, cached corporate financial data is placed at risk when a Web browser is subsequently (and potentially unbeknownst to a user) directed to malicious Web site (that can then examine the browser cache).

Further, since many databases contain large quantities of data, locally caching database data could quickly fill up allocated browser cache space.

Additionally, most, if not all, browsers lack the ability to operate in an "offline" mode. That is, Web browsers typically can not present meaningful content when a Web site is unavailable (e.g., when no active network connection is detected or a corresponding Web server is down), without taking the browser offline for all websites. For example, when a Web browser attempts to load a resource, such as, for example, an HTML page or image, from an unavailable Web server, the Web browser fails to render the resource (even if the resource is cached locally). Thus, even if database data (or any other type of content) were cached, the Web browser would be unable to present the database data (or other type of content) in an offline mode.

BRIEF SUMMARY

The present invention extends to methods, systems, and computer program products for offline execution of Web based applications. In some embodiments, a computer system configures local content for offline use by a Web browser application component of a Web based application. The computer system determines that the Web based application is enabled for offline execution. The computer system detects that the Web based server component for the Web based application is available via network communication.

The computer system receives resources for the Web based application from a Web based server component via network communication. The computer system locally stores the received resources at the computer system. The locally stored copy of the resources accessible to the Web browser client component without requiring network communication. As such, the locally stored resources can be accessed in response to a request from the Web based client component when it is detected that the Web based server component is not available via network communication. The computer system configures the locally stored resources to remain locally stored at the computer system for a specified period of time thereby overriding the default cache reclamation settings of the Web browser.

In other embodiments, a computer system runs a Web based application offline. A Web browser application component for a Web based application sends an online request for Web based application resources to a corresponding Web server application component for the Web based application over network. The computer system detects that the request failed. The computer system determines that the Web based application is enabled for offline execution. The computer system configures the Web browser to execute the Web browser application offline while other Web browser applications remain configured to execute online. The computer system serves the requested Web based application resources from local storage at the computer system without taking the Web browser offline.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

The present invention extends to methods, systems, and computer program products for offline execution of Web based applications. In some embodiments, a computer system configures local content for offline use by a Web browser application component of a Web based application. The computer system determines that the Web based application is enabled for offline execution. The computer system detects that the Web based server component for the Web based application is available via network communication.

The computer system receives resources for the Web based application from a Web based server component via network communication. The computer system locally stores the received resources at the computer system. The locally stored copy of the resources accessible to the Web browser client component without requiring network communication. As such, the locally stored resources can be accessed in response to a request from the Web based client component when it is detected that the Web based server component is not available via network communication. The computer system configures the locally stored resources to remain locally stored at the computer system for a specified period of time thereby overriding the default cache reclamation settings of the Web browser.

In other embodiments, a computer system runs a Web based application offline. A Web browser application component for a Web based application sends an online request for Web based application resources to a corresponding Web server application component for the Web based application over network. The computer system detects that the request failed. The computer system determines that the Web based application is enabled for offline execution. The computer system configures the Web browser to execute the Web browser application offline while other Web browser applications remain configured to execute online. The computer system serves the requested Web based application resources from local storage at the computer system without taking the Web browser offline.

Embodiments of the present invention may comprise a special purpose or general-purpose computer including computer hardware, as discussed in greater detail below. Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, computer-readable media can comprise physical (or recordable type) computer-readable storage media, such as, RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

In this description and in the following claims, a "network" is defined as one or more data links that enable the transport of electronic data between computer systems and/or modules. When information is transferred or provided over a network or another communications connection (either hardwired, wireless, or a combination of hardwired or wireless) to a computer, the computer properly views the connection as a computer-readable medium. Thus, by way of example, and not limitation, computer-readable media can also comprise a network or data links which can be used to carry or store desired program code means in the form of computer-executable instructions or data structures and which can be accessed by a general purpose or special purpose computer.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 1A:
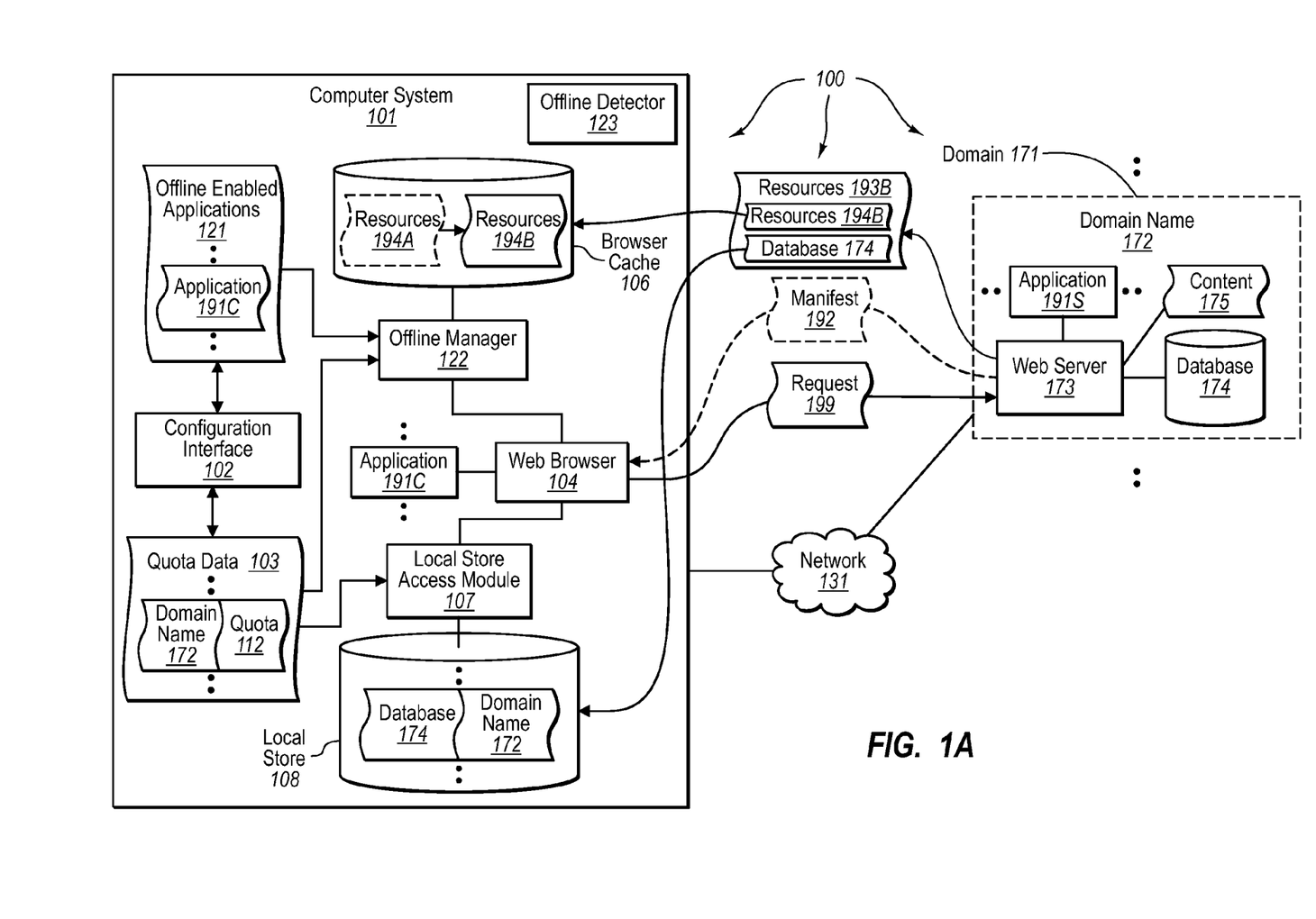
FIG. 1A illustrates an example computer architecture that facilitates configuring local content for offline use by a Web browser application component of a Web based application

FIG. 1A illustrates an example computer architecture 100 that facilitates configuring local content for offline use by a Web browser application component of a Web based application. Computer architecture 100 includes computer system 101, network 131, and domain 172. Depicted in computer architecture 100 are various components including application 191C, Web browser 104, application 191S, and Web server 173. Each of the various components can be connected to network 131, such as, for example, a Local Area Network ("LAN"), a Wide Area Network ("WAN"), or even the Internet. Thus, the various components can receive data from and send data to other components connected to the network. Accordingly, the components can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network. For example, components can exchange Simple Object Access Protocol ("SOAP") envelopes containing Web service related data. In some embodiments, application 191C and application 191S are different portions of a distributed application, such as, for example, a Web services application.

Web browser 104 can be configured to request Web-based content from domains, such as, for example, domain 171, accessible via network 131. Web-based content can include text data, image data, audio/video data, etc. One or more Web-based applications, such as, for example, application 191C, can be configured to run within Web browser 104. A Web-based application can be a script and/or other computer-executable instructions. Web-based applications can request other types of data, such as, for example, database data, from domains accessible via network 131.

Domain 171 can be identified by domain name 172, such as, for example, domain name service ("DNS") name that is resolvable to an IP address. Domain name 172 can be entered to a Web browser (potentially along with other identifying information for a specified application within the domain 171) to direct a browser to request content from Web server 173. A domain name along with other identifying information can be included in a Uniform Resource Locator ("URL") entered into a Web browser. Depending on a type of request and/or a received URL, Web server 153 can access content from content 175 and/or initiate a Web-based application, such as, for example, application 191S. Application 191S can request data from other locations in domain 171, such as, for example, from database 174 (e.g., a SQL or other relational database). Web server 173 can include content from 175 and/or data from database 174 in a response to a Web browser request.

Browser cache 106 is configured to cache components included in Web-based content received from domains, including domain 171. The cached components can subsequently be made available to fulfill Web-based requests sent from Web browser 104. For example, cached components can be portions of content 155 accessed directly from browser cache 106 (without the need for transporting the cached components via network 131) and rendered within Web browser 104.

When a Web browser is attempting to process a request from a Web application in Web browser 104, the Web browser can access browser cache 106 to search for locally cached components. When cached components are identified, the Web browser can access the components and include the components in a response that is to be rendered within the Web application in Web browser 104.

Local store access module 107 manages access to local store 108. Local store 108 is configured to store database data received in response to Web-based requests. Database data stored in local store 108 can be accessed by Web browser 104 (without the need for transporting the database data via network 131) and rendered in a Web-based application within Web browser 104. Database data can be stored in local store 108 along with an indication of the domain that sent the database data to Web browser 104.

Local store access module 107 can filter requests from script code modules from Web servers requesting access to database data stored in local store 108 such that one domain is prevented from accessing another domains database data (i.e., database data can be sandboxed by domain). Thus, although database data is stored in local store 108, the database data is not generally accessible to fulfill requests for any domain.

Offline manager 122 is configured to manage the offline status of applications. When offline manager 122 receives an indication that an application is enabled for offline execution, offline manager 122 can attempt to populate browser cache 106 and/or local store with components and/or data for offline operation of the application. That is, offline manager 122 can initiate communication with a Web server that is online to download components and/or data potentially needed for offline execution of application in the event that communication with the Web server is subsequently lost.

Offline manager 122 can extend the expiration of components to be used for offline execution to override the default cache reclamation policies of Web browser 104. For example, offline manager 122 can set the expiration of components to be used for offline execution to 30 days. Extending the expiration of components to be used for offline execution can prevent the browser from scavenging the components as Web browser 104 navigates other Web sites.

Configuration interface 102 facilitates user configuration of offline enabled applications and storage quotas for domains. For example, a user can select application 191C as an application enabled for offline execution thereby causing application 191C to be included in offline line enabled applications 121 (e.g., a list of applications that a user of computer system 101 has identified as offline enabled). A user can also initially set as well as alter the value of a storage quota for a domain. For example, a user can set the value of quota 112 for domain 171 (represented by domain name 172) within quota data. Generally, a quota is an amount of storage space allocated to a domain for storing items locally at computer system 101 (e.g., in browser cache 106 and/or local store 108). Configuration interface 102 can present user-interface controls for receiving and implementing user settings for offline enabled applications and domain quotas. Although depicted separately, offline manager 122 and local store access module 107 can cooperatively interact such that the sum of storage space consumed in browser cache 106 and in local store 108 for a specified domain does not exceed a quota for the specified domain.

Offline detector 123 is configured to detect when Web browser 104 or a Web-based application is unable to communicate with a Web server. Communication with a Web server can be unavailable for a number of reasons, such as, for example, failure of a communication link to or on the Internet, the Web server has crashed, etc. In some embodiments, offline detector 123 attempts to contact a Web server from time to time or at a specified interval to determine if contact with the Web server is available.

Offline detector 123 can notify offline manager 122 and/or local store access module 107 when status of communication with a Web server changes. For example, offline detector 123 can send a notification when an available Web server becomes unavailable (e.g., a communication failure, the Web server crashes, etc.) and when an unavailable Web server becomes available (e.g., a communication is restored, the Web server begins operations after a restart, etc.) Offline detector 123 can also send user-interface notifications (e.g., through configuration interface 102) alerting a user to transitions in the availability of a Web server.

Figure 2:
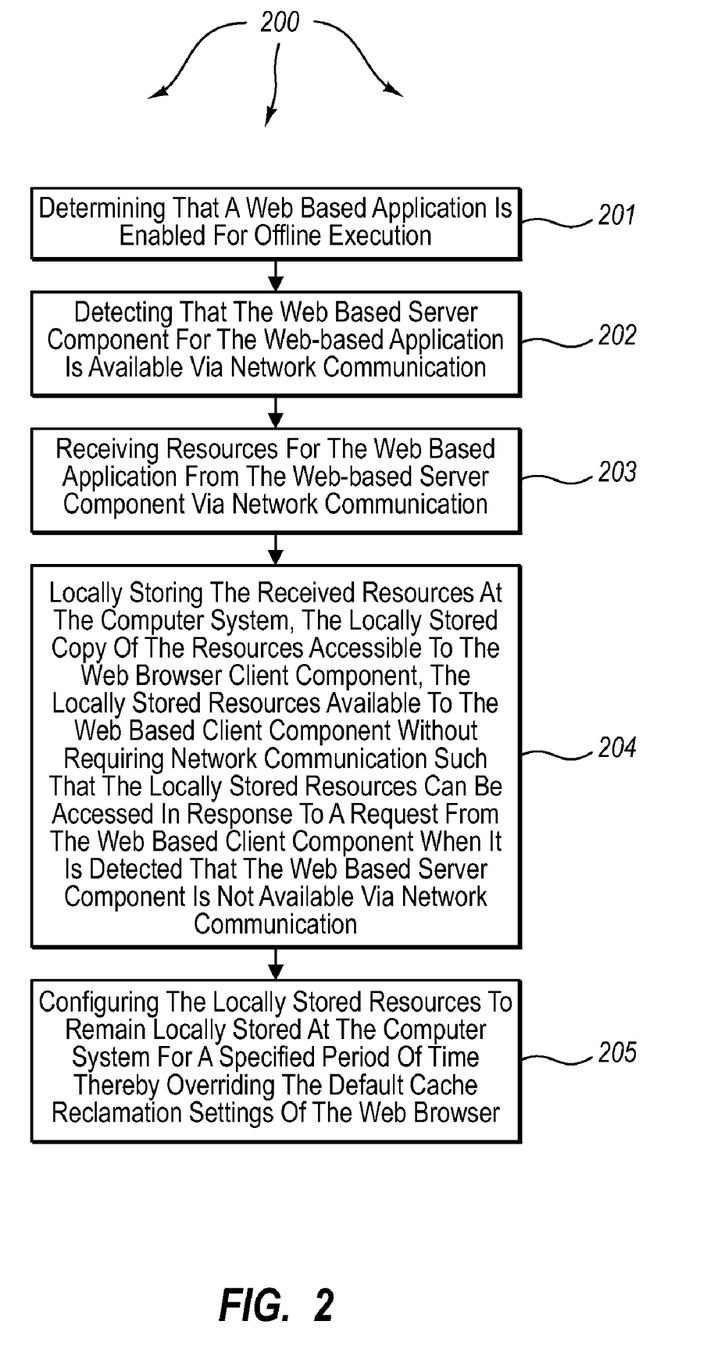
FIG. 2 illustrates a flow chart of an example method for configuring local content for offline use by a Web browser application component of a Web based application.

FIG. 2 illustrates a flow chart of an example method 200 for configuring local content for offline use by a Web browser application component of a Web based application. Method 200 will be described with respect to the components and data of computer architecture 100 in FIG. 1A.

Method 200 includes an act of determining that a Web based application is enabled for offline execution (act 201). For example, offline manager 122 can access offline enabled applications 121 to determine that application 191C is enabled for offline execution. Method 200 includes an act of detecting that the Web based server component for the Web based application is available via network communication (act 202). For example, offline detector 123 can detect that Web server 173, application 191S, and other components in domain 172 are available for communication over network 131.

In response to detecting available communication, Web browser 104 can send a request for resources to facilitate offline execution of application 191C. For example, Web browser 104 can send request 199 to Web server 713. Request 199 can include a request for various different resources including, but not limited to, content from content 175, database data from database 174, and portions of executable-instructions (e.g., scripts) corresponding to application 191S.

Web server 173 can receive request 199. In response to receiving request 199, Web server 173 can gather a collection of resources (e.g., resources 193B) to facilitate offline execution of application 191C. That is, Web server 173 can "tear off" (e.g., make a functional copy of) a portion of a Web site within domain 172 for transfer to computer system 101. Web server 173 can send the collection of resources to computer system 101. For example, in response to request 199, Web server 173 can send resources 193B (a collection of resources for facilitating offline execution of application 191C) to computer system 101. Resources 193B can include resources 194B (code of application 191S, content from content 175, etc) and database 174 (or a portion thereof).

In some embodiments, a domain can also send a resource manifest prior to sending a collection of resources. A resource manifest can identify the resources to be included collection of resources and can indicate the storage requirements for storing the collection of resources. A resource manifest can also indicate a module that is to be executed locally to facilitate offline execution of an application when a URL (that would otherwise cause remote execution at a Web server or server side distributed application component) corresponding to the application is received. A resource manifest can also indicate a module that is to be executed to synchronize resources for facilitating offline execution of an application. Resources can be synchronized when a previously unavailable Web server and/or application becomes available, periodically with an available Web server and/or application, or in response to a user request to synchronize with an available Web server and/or application. Modules for initiating offline execution and modules for synchronizing resources can themselves be resources that are included in a collection of resources for facilitating offline execution of an application.

As depicted in computer architecture 100, for example, Web server 173 can send manifest 192 to computer system 101. Manifest 192 can identify resources in resources 193B, indicate the storage requirements for resources 193B, indicate a module that is to be executed for offline execution of application 191C when a URL corresponding to Web server 173 and/or application 191S is received at Web browser 104, and indicate a module that is to be executed to synchronize resources 193B. Below is an example XML resource manifest (line numbers are included for reference purposes):

```
1.   <?xml version="1.0" encoding="utf-8" ?>
2.   <resources name="Expense Report">
3.     <resource src="default.css" />
4.
5.     <resource src="images/reconcile.jpg" />
6.     <resource src="images/personal.jpg" />
7.     <resource src="images/dispute.jpg" />
8.     <resource src="images/hold.jpg" />
9.
10.    <resource src="ExpenseReportService.asmx/js" />
11.    <resource src="ExpenseReportLineItemService.asmx/js" />
12.
13.    <resource src="DefaultSync.aspx" />
14.
15.    <resource src="ExpenseReports.aspx" />
16.    <resource src="ExpenseReport.aspx" />
17.
18.    <runOfflineUrl src="ExpenseReports.aspx" />
19.    <takeOnlineOrSyncUrl src="DefaultSync.aspx" />
20.    <database spaceNeeded="60" />
21.  </resources>
```

Within the example manifest, lines 3-16 identify resources for facilitating offline execution of an "Expense Report" application (identified at line 2). Line 20 indicates storage requirements of "60" for storing the resources identified in the manifest (e.g., in megabytes). Line 18 indicates that the module "ExpenseReports.aspx" (e.g., a script) is to be executed locally (e.g., at computer system 104) to initiate offline execution of the Expense Report application. ExpensEReports.aspx is identified as a resource at line 15. Line 19 indicates that the module "DefaultSync.aspx" (e.g., a script) is to be executed locally to synchronize the resources identified in the example manifest. "DefaultSync.aspx" is identified as a resource at line 13.

Method 200 includes an act of receiving resources for the Web based application from the Web based server component via network communication (act 203). For example, Web browser 104 can receive resources 193B from domain 171.

In some embodiments, prior to receiving resources 193B, offline manager 122 and/or local store access module 108 determine that storage of resources 193B is appropriate based on quota 112. That is, offline manager 122 and/or local store access module 105 verify that the allocated storage space for domain 171 is sufficient to store resources 194B and database 174. If allocated storage space is sufficient, Web browser 104 can accept resources 193B

If allocated storage space is not sufficient based on quota 112, resources 193B (or a portion thereof) can be rejected. Alternately, configuration interface 102 can notify a user of computer system 102 that allocated storage space for domain 172 is not sufficient to store resources 193B. If appropriate, the user can then increase quota 112 through configuration interface 102 to an amount sufficient for storing resources 193B. If a user chooses not to increase quota 112 to an amount sufficient for storing resources 193B, resources 193B (or a portion thereof) can be rejected.

Method 200 includes an act of locally storing the received resources at the computer system, the locally stored copy of the resources accessible to the Web browser client component, the locally stored resources available to the Web based client component without requiring network communication such that the locally stored resources can be accessed in response to a request from the Web based client component when it is detected that the Web based server component is not available via network communication (act 204). For example, Web browser 104 can store resources 194B in browser cache 106 and can store database 174 (along with domain name 172) in local store 108. Thus, resources 194B and database 174 are available to Web browser 104 and application 191C without transferring resources 194B and database 174 over network 131. Accordingly, resources 194B and database 174 can be used to facilitate offline execution of application 191C. For example, when domain 171 is unreachable, a request from application 191C (to application 191S) for a resource in resources 194C can be fulfilled by accessing the resource from browser cache 106. A module configured to receive requests (e.g., corresponding to the URL for application 191S) during offline execution can facilitate access to the resource in browser cache 106.

Method 200 includes an act of configuring the locally stored resources to remain locally stored at the computer system for a specified period of time thereby overriding the default cache reclamation settings of the Web browser (act 205). For example offline manager 123 can extend the time when resources 194B are to expire. Extending when a resource expires can include marking a resource with a sticky bit having a fairly long expiration (e.g., 30 days). Use of a sticky bit can override the default cache reclamation settings of the Web browser. For example, marking resources in resources 194B with a sticky bit can override the cache reclamation policies associated with browser cache 106.

In some embodiments, resources for offline execution of application are pre-cached. Resources can be pre-cached prior to detecting that a Web based server components is unavailable. For example, upon an initial indication that a Web based application is enabled for offline execution (e.g., when user initially includes an application in offline enable applications 121), offline manager 122 can request resources to facilitate offline execution of the Web based application. Accordingly, the Web based application is more efficiently transitioned for offline execution when a subsequent communication failure occurs.

Figure 1B:
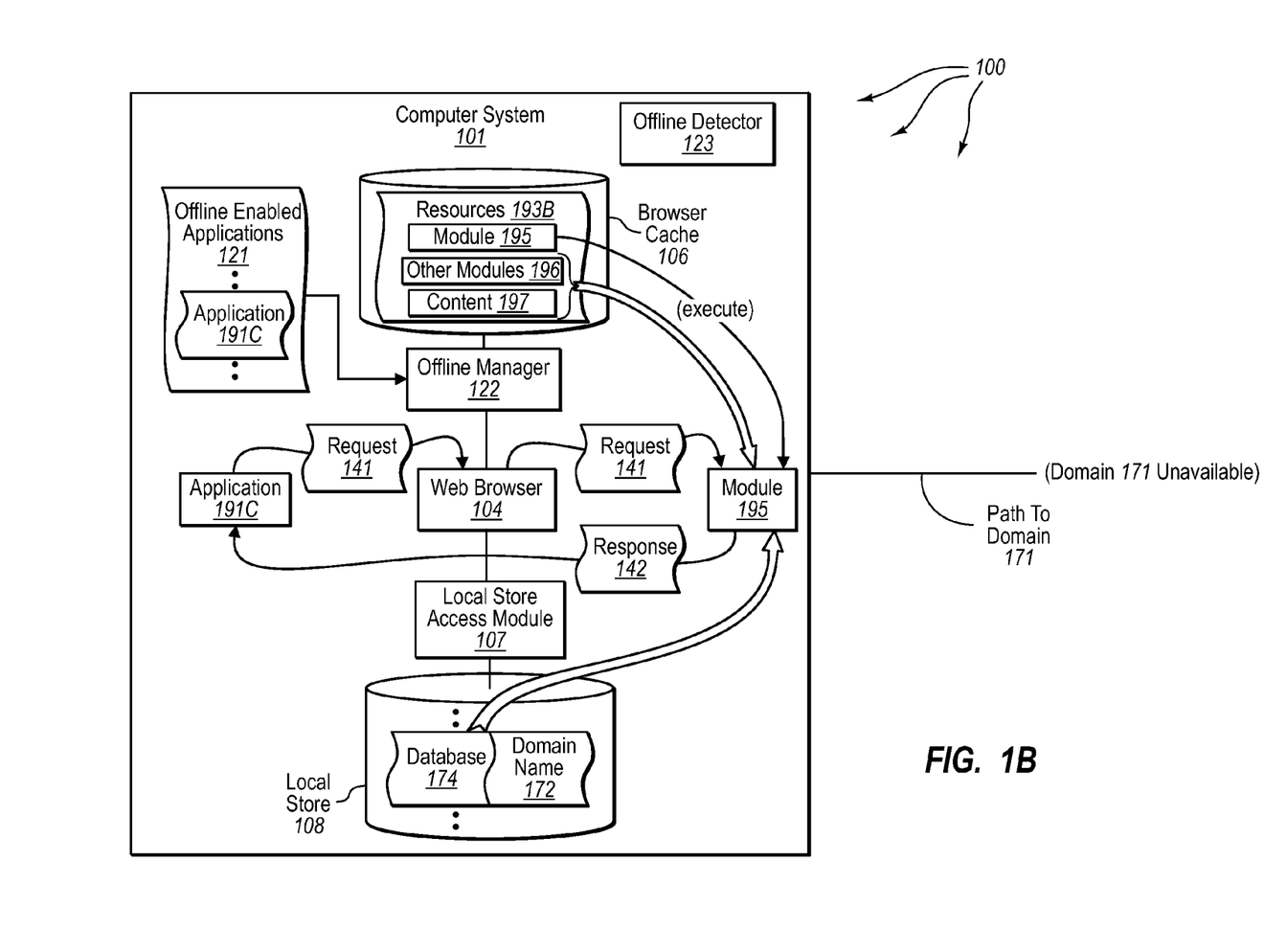
FIG. 1B illustrates the example computer architecture that facilitates running a Web based application offline.

In other embodiments, locally stored resources are synchronized with correspond resources available to a Web based server component. For example, it may be that resources 194A were previously stored in browser cache 106 for offline execution of application 191C. However, at some time after storage of resources 194A, portions of content 174 were updated. Accordingly, resources 194B are received to synchronize locally stored resources with the resources available to Web server 173 and/or application 191S. Synchronization can cause prior versions of locally stored resources to be overwritten. For example, reception of resources 194B can cause resources 194A to be overwritten. Sticky bits can be reset after synchronization FIG. 1B illustrates computer architecture 100 that facilitates running a Web based application offline. Computer architecture 100 depicted in FIG. 1B shows a more detailed view of resources 194B. Resources 194B include module 195, other modules 196 and content 197. Module 195 (e.g., a script) is the module that is to be executed to facilitate offline execution of application 191C. Module 195 can be executed when a URL for application 191S is received when domain 171 is unavailable. Module 195 can previously have been identified in manifest 192. Other modules 196 represent other modules (e.g., other scripts) that can be called during execution of module 195 to facilitate offline execution of application 191C. Content 197 represent content for facilitating offline execution of application 191C.

Figure 3:
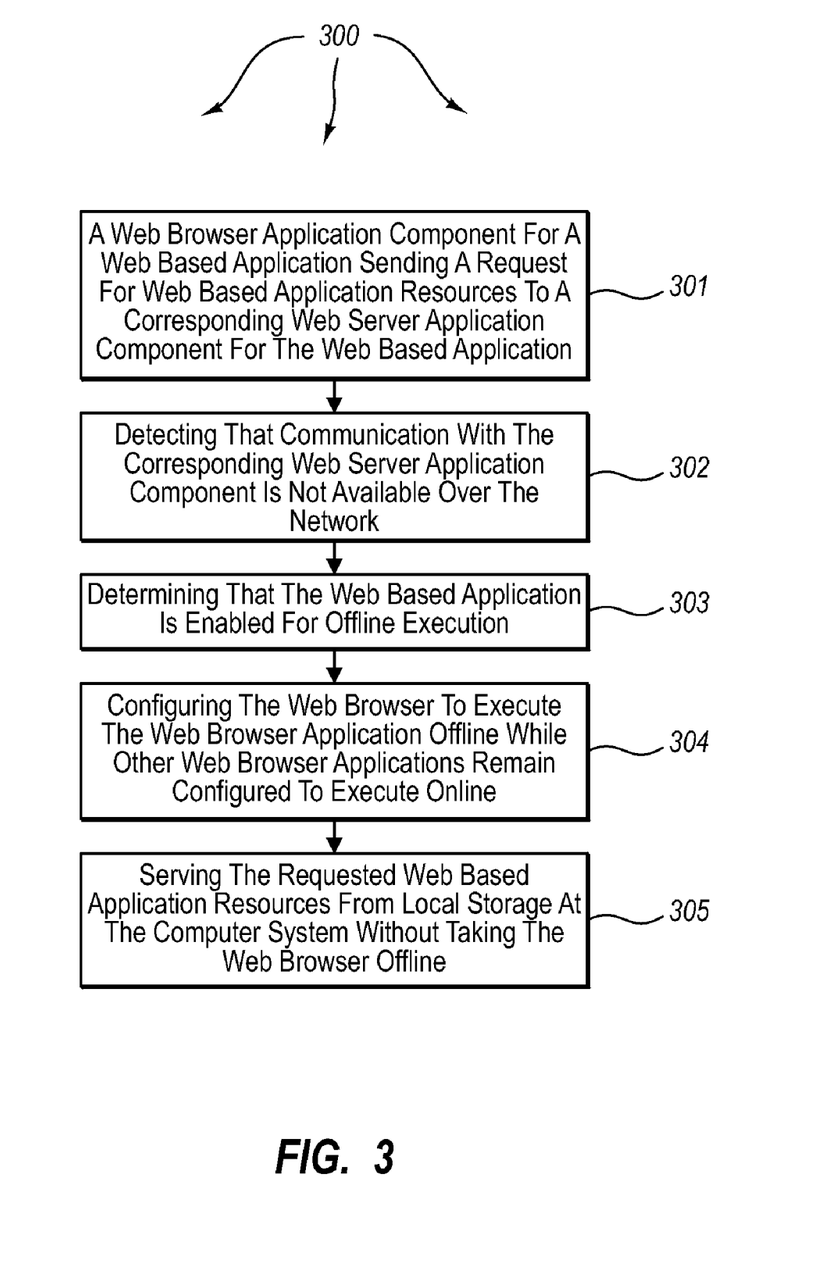
FIG. 3 illustrates a flow chart of an example method for running a Web based application offline.

FIG. 3 illustrates a flow chart of an example method 300 for running a Web based application offline. Method 300 will be described with respect to the components and data of computer architecture 100 in FIG. 1B.

Method 300 includes an act of a Web browser application component for a Web based application sending a request for Web based application resources to a corresponding Web server application component for the Web based application (act 301). For example, application 191C can submit request 141 to Web browser 104. Request 141 can include a URL in domain 171 indicating a request for resources from application 191S.

Method 300 includes an act of detecting that communication with the corresponding Web server application component is not available over the network (act 302). For example, offline detector 123 can detect that domain 171 is unavailable. Offline detector 123 can detect the unavailability of domain 171 when no response is received for request 141. Offline detector may attempt further communication with domain 172 prior to determining that domain 171 is unavailable. Alternately, offline detector 123 may have detected that domain 171 was unavailable prior to the occurrence of request 141.

Method 300 includes an act of determining that the Web based application is enabled for offline execution (act 303). For example, in response to domain 171 being detected as unavailable, offline manager 122 can refer to offline enabled applications 121 to determine that application 191C is enabled for offline execution.

Method 300 includes an act of configuring the Web browser to execute the Web browser application offline while other Web browser applications remain configured to execute online (act 304). For example, offline manager 122 can execute module 195 and configure browser 104 such that requests form application 191C are directed to module 195 and responses from module 195 are directed to application 191C. However, requests from and responses to other applications are not redirected. That is, Web browser 104 can continue to communicate via network 131 with other domains. Accordingly, Web browser 104 can send Web based requests to other domains and receive Web based responses form other domains over network 131 during the time communication for application 191C is transferred to and from module 195.

Method 300 includes an act of serving the requested Web based application resources from local storage at the computer system without taking the Web browser offline (act 305). For example, module 195 can formulate response 142 to request 141 using other modules 196, content 197, and database 174. Module 195 can send response 142 (potentially through Web browser 104) to application 191C.

Web browser 104 can continue to send Web based requests to other domains and receive Web based responses form other domains over network 131 during the time resources for response to request 141 are accessed from local storage. Thus, while other modules 196, content 197, and database 174 are being accessed for formulating a response for request 141, requests and responses sent via network 131 can also be retrieving and storing other data in browser cache 106 and local store 108.

Embodiments of the present invention facilitate the local storage of Web based executable instructions and data at a computer system. The Web based executable instructions and data can be used to locally fulfill requests (sent to a domain that sent the executable instructions and data) from modules associated with a Web browser at the computer system. Accordingly, locally stored Web based executable instructions and data can be used at the computer system to simulate communication with Web site when the Web site is otherwise unavailable.

Embodiments of the present invention can facilitate transparent extension of non-volatile storage at a computer system in accordance with user and computer system configuration rules. Maintenance of a plurality of shadow copies of a file provides redundancy resulting in more efficient recovery if a volume fails. Further, file operations can be propagated between shadow copies in the background at times when systems resources are not otherwise under heavy use.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a computer system connected to a network, the computer system including a Web browser and a plurality of Web browser application components for corresponding Web based applications, the Web browser for executing Web browser application components to access resources from Web server application components of the corresponding Web based applications respectively, a method for storing local content for offline use by a Web browser application component, the method comprising:

an act of determining that the Web based application is enabled for offline execution;

an act of detecting that a Web based server component for the Web based application is available via network communication at a Web site in a specified domain;

an act of sending a request to the Web based server component for resources to facilitate offline execution of the Web based application in response to detecting that the Web based server component for the Web based application is available via network communication, the request including: a request for content corresponding to the Web based application, a request for executable application code for the Web based application, and a request for database data from a database corresponding to the Web based application;

prior to receiving the resources from the Web based server component, an act of receiving a manifest that specifies a collection of resources the Web based server component is to send to the computer system for local storage and that specifies the storage requirements for storing the collection of resources, the manifest also specifying: the executable code module that is to be executed locally at the computer system when the Web server is unavailable, and a synchronization module that is to be executed locally at the computer system when there exists network communication with the Web based server component for synchronizing the locally-stored collection of resources with the Web based application at the Web based server; and an act of determining whether the storage requirements specified in the manifest exceed a quota and upon determining that the storage requirements exceed the quota, prompting the user to authorize the increase of the quota to an amount sufficient to store the collection of resources; an act of receiving the collection of resources for the Web based application from the Web based server component via network communication subsequent to sending the request, the collection of resources collectively representing a locally-executable copy of at least a portion of the Web site that was torn off from the specified domain for offline execution at the computer system, the collection of resources including:

content corresponding to the Web based application;

executable code for the Web based application, including an executable module that is to be executed locally at the computer system when the Web server is unavailable, the executable code module for receiving requests from the Web browser and generating corresponding responses; and at least a portion of database data from the database corresponding to the Web based application;

an act of locally storing the received collection of resources at the computer system, the locally stored content and executable code for the Web based application stored in a Web browser cache and the locally stored database data stored in a separate local store that is separate from the browser cache, the content and database data accessible to the executable code module without requiring network communication with the Web based server component, such that the content, the executable code module, and the database data can be used to generate a response to a subsequent request from the Web browser to access the torn off portion of the Web site when it is detected that the Web based server component is not available via network communication;

an act of receiving a request from the Web browser to access a portion of the Web site at the specified domain;

upon determining that communication with the specified domain is unavailable, an act of the Web browser locally loading the executable module from the Web browser cache to satisfy the request while one or more other Web browser applications continue to execute via network communication; and an act of overriding the default cache reclamation settings of the Web browser to extend when the content and the executable code for the Web based application expire from the Web browser cache.

2. The method as recited in claim 1, wherein an act of detecting that the Web based server component for the Web based application is available via network communication comprises an act of reestablishing communication with a Web server after the Web server was unavailable for some period of time.

3. The method as recited in claim 1, wherein an act of locally storing the received resources at the computer system comprises an act of pre-caching the received resources prior to detecting that the Web based server component is subsequently unavailable.

4. The method as recited in claim 1, wherein access to the local store is filterable by originating domain such that the at least a portion of the database is not generally accessible to fulfill requests for any domain.

5. The method as recited in claim 1, wherein the act of overriding the default cache reclamation settings of the Web browser comprises an act of marking the content and the executable code for the Web based application with a sticky bit to extend when the content and the executable code for the Web based application expire from the Web browser cache.

6. At a computer system connected to a network, the computer system including a Web browser and a plurality of Web browser application components for corresponding Web based applications, the Web browser for executing Web browser application components to access resources from Web server application components of the corresponding Web based applications respectively, a method for running a Web based application offline, the method comprising:

an act of a receiving a request from a Web browser to access a portion of a Web site at a specified domain, the request originating from a Web browser application component for a Web based application attempting to communicate with a corresponding Web server application component for the Web based application, the Web server application component accessible at the portion of the Web site in the specified domain;

an act of detecting that communication with the specified domain is not available over the network subsequent to receiving the request;

an act of determining that the Web based application is enabled for offline execution;

an act of accessing a locally stored manifest that specifies a collection of resources and storage requirements for storing the collection of resources, the collection of resources comprising a locally-executable copy of the Web based application, the collection of resources including:
content corresponding to the Web based application;
executable code for the Web based application; and
at least a portion of database data from a database corresponding to the Web based application;
the manifest also specifying: an executable code module, which is included in the collection of resources, that is to be executed locally at the computer system when the Web server is unavailable for receiving requests from the Web browser and generating corresponding responses, and a synchronization module that is to be executed locally at the computer system when there exists network communication with the Web based server component for synchronizing the locally-stored collection of resources with the Web based application at the Web based server;

an act of determining whether the storage requirements specified in the manifest exceed a quota and upon determining that the storage requirements exceed the quota, prompting the user to authorize the increase of the quota to an amount sufficient to store the collection of resources;

an act of locally accessing the locally-executable copy of the portion of the Web site at the computer system by executing the executable code module specified in the manifest, in response to determining that the Web based application is enabled for offline execution;

an act of the Web browser interacting with the locally-executable copy of the portion of the Web site to identify one or more resources, from among the collection of resources, responsive to the request while one or more other Web browser applications continue to execute via network communication, the Web browser interacting with the locally-executable copy of the portion of the Web site comprising locally loading the executable module from the Web browser cache; and an act of the executable code module serving the one or more resources from the Web browser cache and the separate local store to the Web browser application component in response to the request and without taking the Web browser offline, comprising the executable code module accessing the content and the executable code for the Web based application from a Web browser cache and the database data from a separate local store that is separate from the browser cache such that the requested Web based application resources are served to the Web browser application component without any network communication occurring subsequent to receiving the request; and an act of overriding the default cache reclamation settings of the Web browser to extend when the content and the executable code for the Web based application expire from the Web browser cache.

7. The method as recited in claim 6, wherein the act of the receiving a request comprises an act of receiving a URL for the Web server application component.

8. The method as recited in claim 6, wherein the act of determining that the Web based application is enabled for offline execution comprises an act of referring to a list of applications that are enabled for offline execution.

9. The method as recited in claim 6, wherein the act of the executable code module serving the one or more resources from the Web browser cache and the separate local store to the Web browser application component further comprises:

an act of directing the request to the loaded module;

an act of the loaded module formulating a complete response to request using only the one or more resources accessed from Web browser cache and the separate local store; and an act of transferring the complete response to the Web browser application component.

10. A computer system, comprising:
one or more processors;
system memory; and
one or more physical computer-readable media disposed locally at the computer system, the one or more physical computer-readable media having stored thereon computer-executable instructions that, when executed at a processor, cause the computer system to perform a method for configuring local content for offline use by a Web browser application component of a Web based application, including performing the following:
determining that the Web based application is enabled for offline execution;
detecting that a Web based server component for the Web based application is available via network communication at a Web site in a specified domain;
sending a request to the Web based server component for resources to facilitate offline execution of the Web based application in response to detecting that the Web based server component for the Web based application is available via network communication, the request including: a request for content corresponding to the Web based application, a request for executable application code for the Web based application, and a request for database data from a database corresponding to the Web based application;
prior to receiving the resources from the Web based server component, an act of receiving a manifest that specifies a collection of resources the Web based server component is to send to the computer system for local storage and that specifies the storage requirements for storing the collection of resources, the manifest also specifying: the executable code module that is to be executed locally at the computer system when the Web server is unavailable, and a synchronization module that is to be executed locally at the computer system when there exists network communication with the Web based server component for synchronizing the locally-stored collection of resources with the Web based application at the Web based server; and
an act of determining whether the storage requirements specified in the manifest exceed a quota and upon determining that the storage requirements exceed the quota, prompting the user to authorize the increase of the quota to an amount sufficient to store the collection of resources;
receiving the collection of resources for the Web based application from the Web based server component via network communication subsequent to sending the request, the collection of resources collectively representing a locally-executable copy of at least a portion of the Web site that was torn off from the specified domain for offline execution at the computer system, the collection of resources including:
content corresponding to the Web based application;
executable code for the Web based application, including an executable module that is to be executed locally at the computer system when the Web server is unavailable, the executable code module for receiving requests from the Web browser and generating corresponding responses; and
at least a portion of database data from the database corresponding to the Web based application;
locally storing the received collection of resources at the computer system, the locally stored content and executable code for the Web based application stored in a Web browser cache and the locally stored database data stored in a separate local store that is separate from the browser cache, the content and database data accessible to the executable code module without requiring network communication with the Web based server component, such that the content, the executable code module, and the database data can be used to fulfill a subsequent request from the Web browser to access the torn off portion of the Web site when it is detected that the Web based server component is not available via network communication; and
overriding the default cache reclamation settings of the Web browser to extend when the content and the executable code for the Web based application expire from the Web browser cache; and
the one or more physical computer-readable media having stored thereon computer-executable instructions that, when executed at a processor, cause the computer system to perform a method for running the Web based application offline, including performing the following:
receiving a request from a Web browser to access a portion of a Web site at a specified domain, the request originating from a the Web browser application component for the Web based application attempting to communicate with a corresponding the Web server application component for the Web based application, the Web server application component accessible at the portion of the Web site in the specified domain;
detecting that communication with the specified domain is not available over the network subsequent to receiving the request;
determining that the Web based application is enabled for offline execution;
locally accessing a locally-executable copy of the portion of the Web site at the computer system in response to determining that the Web based application is enabled for offline execution, the locally-executable copy having previously been torn off from the specified domain for local execution at the computer system, the locally-executable copy of the portion of the Web site including a collection of resources locally stored at the computer system, the collection of resources including:
content corresponding to the Web based application;
executable code for the Web based application, including an executable code module that is executed locally at the computer system when the Web server is unavailable, the executable code module for receiving requests from the Web browser and generating corresponding responses; and
at least a portion of database data from the database corresponding to the Web based application;
the Web browser interacting with the locally-executable copy of the portion of the Web site to identify one or more resources, from among the collection of resources, responsive to the request while one or more other Web browser applications continue to execute via network communication, the Web browser interacting with the locally-executable copy of the portion of the Web site comprising locally loading the executable module from the Web browser cache; and
the executable code module serving the one or more resources from the Web browser cache and the separate local store to the Web browser application component in response to the request and without taking the Web browser offline, comprising the executable code module accessing the content and the executable code for the Web based application from a Web browser cache and the database data from a separate local store that is separate from the browser cache such that the requested Web based application resources are served to the Web browser application component without any network communication occurring subsequent to receiving the request.

11. The computer system as recited in claim 10, wherein locally storing the received collection of resources at the computer system comprises pre-caching the received collection of resources prior to detecting that the Web based server component is subsequently unavailable.

12. The computer system as recited in claim 10, wherein locally storing the collection of resources at the computer system comprises synchronizing locally stored resources with resources available to the Web based server component within the specified domain.

13. The computer system as recited in claim 10, further comprising computer-executable instructions that, when executed, cause the computer system to perform the following:

sending a user notification of the availability of the Web based server component in response to detecting that the Web based server component for the Web based application is available via network communication.

14. The computer system as recited in claim 10, wherein the executable code module serving the one or more resources from the Web browser cache and the separate local store to the Web browser application component further comprises:

directing the request to a locally loaded module;

the loaded module formulating a complete response to request using only the one or more resources accessed from the Web browser cache and the separate local store; and transferring the complete response to the Web browser application component.

* * * * *

UNITED STATES PATENT AND TRADEMARK OFFICE
CERTIFICATE OF CORRECTION

PATENT NO. : 7,814,234 B2
APPLICATION NO. : 11/554435
DATED : October 12, 2010
INVENTOR(S) : Jonathan C. Hawkins et al.

It is certified that error appears in the above-identified patent and that said Letters Patent is hereby corrected as shown below:

In column 13, line 40, in Claim 6, after "of" delete "a".

In column 16, line 18, in Claim 10, before "the" delete "a".

Signed and Sealed this

Fifteenth Day of February, 2011

David J. Kappos
*Director of the United States Patent and Trademark Office*